INVENTORS
CHARLES F. BATCHELDER
JEROME A. RUBICO
BY
Russell, Chittick + Pfund

United States Patent Office 3,443,288
Patented May 13, 1969

3,443,288
FLANGED ADHESIVE ROLLER WAFER
Charles F. Batchelder, Milton, and Jerome A. Rubico, Boston, Mass., assignors to Batchelder-Rubico, Inc., Boston, Mass., a corporation of Massachusetts
Filed Jan. 3, 1967, Ser. No. 607,053
Int. Cl. B42f *1/00, 5/00*
U.S. Cl. 24—67                                            4 Claims

ABSTRACT OF THE DISCLOSURE

Pressure sensitive tape having adhesive on only one side is rolled into a tube and flattened with a flange of the tape extending beyond one edge of the flattened tube. When two articles adhesively held together by the tube are separated, the flange assures that the tape remains with the article to which it originally adhered.

---

Figure 1A:
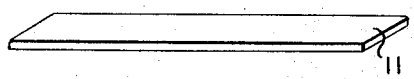

This invention relates generally to adhesive wafers of the type shown in our Patent No. 3,257,678 and more particularly to an improved wafer which permits selective adhesion to one of the parts temporarily joined by the wafer in order that when the parts are separated the wafer is always adhered to the selected part.

In our previous patent the use of a tubular adhesive wafer with the adhesive on the outside tubular surface for temporarily joining parts together was disclosed in which the tubular shaped wafer would permit the parts to be separated by a sliding action that caused the tube to roll, thereby peeling the adhesive surface from one or the other parts until the separation was complete. With this rolling action, the adhesive surface of the tube would peel at one edge and lay down at the other edge as the parts were separated in sliding motion and this action occurred equally with respect to both parts. Thus the ultimate separation of the parts resulted in the wafer adhering to one or the other of the parts depending upon such factors as the nature of the surfaces of the respective parts and the peeling process which controls the rolling of the adhesive during the separating operation.

In some operations it is highly desirable to assure that the adhesive wafer always adheres to one part or the other and to be able to control this feature selectively if desired. For example, in the lasting of a shoe in which the wafers are used to attach the insole to the last, it is highly desirable that the wafers adhere to the last when it is withdrawn from the shoe in order that the wafers do not remain inside the shoe as it is processed to completion thus requiring their removal on final inspection. The present invention accomplishes this objective by providing a tubular adhesive wafer having an outer surface coated with pressure sensitive adhesive and an inner surface free of adhesive with an extension of a single face pressure sensitive adhesive extending beyond the fold lines of the tubular wafer when it is flattened. This construction in effect produces two different size adhesive areas attached to the objects which are to be held which are attached by the membrane of the adhesive tape of which the wafer is formed at the fold lines of the tubular portion. When the flange extends in the direction of motion of the part to which it is desired the wafer adheres upon separation, a rolling peel occurs on relative sliding motion of the joined parts in which the tubular portion of the wafer unrolls and the flange portion stays adhered to the part to which it is attached. As the tubular portion of the wafer unrolls it is applied adhesively to the part to which the flange is attached until it has been peeled free of the other part thereby completely separating the two members.

Accordingly it is the principal object of the present invention to provide an improved flanged tubular adhesive wafer which can be used to selectively adhere to one of two parts which are temporarily joined by the wafer and subsequently separated by a sliding motion in predetermined direction.

Figure 2A:
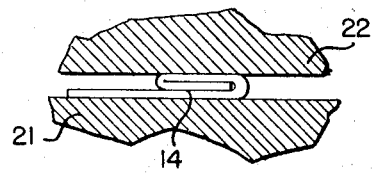
Figure 4:
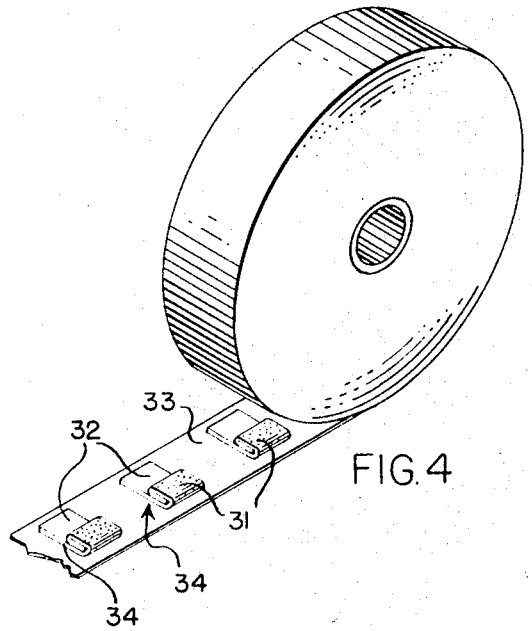
Figure 3:
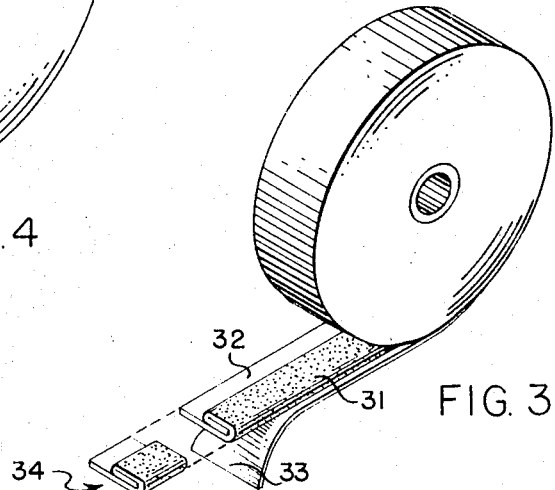
Figure 5:
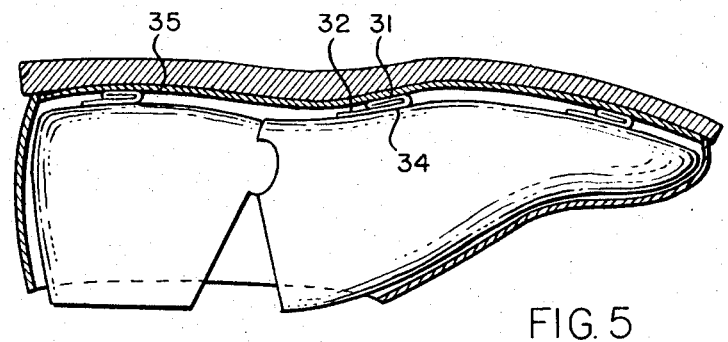
Figure 6:
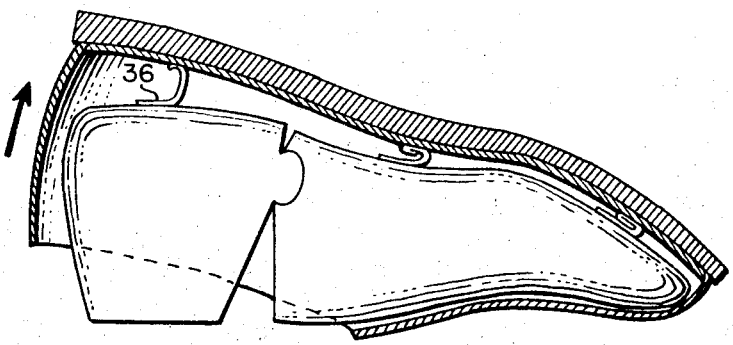
Figure 7:
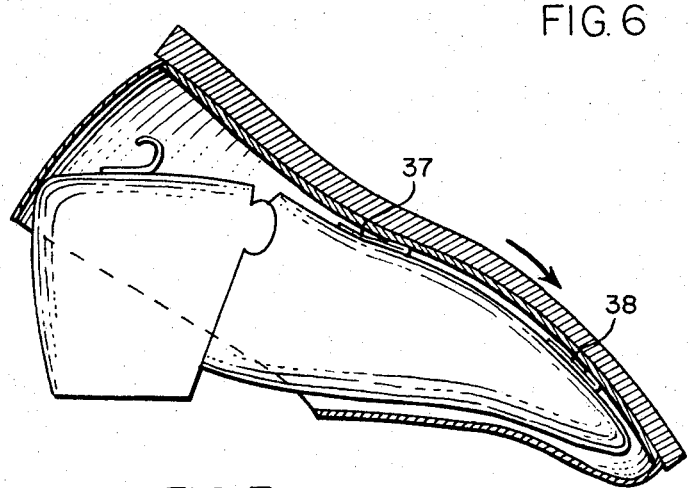

The foregoing principal object and other features and advantages of the invention will be readily understood from the following detailed description taken in conjunction with the accompanying drawings wherein:

FIGS. 1(a), (b) and (c) show the successive steps in forming a wafer in accordance with the invention from a strip of single face pressure sensitive adhesive tape;

FIGS. 2(a), (b) and (c) show the successive conditions of the wafer as the parts held together thereby are separated by a relative sliding motion;

FIGS. 3 and 4 show two arrangements for packaging the wafer material of the invention in a manner convenient for dispensing individual wafers; and FIGS. 5, 6, and 7 show the successive steps of the method of the invention applied for temporarily holding parts of a shoe to a last.

Referring now to FIGS. 1(a), (b) and (c) the construction of the preferred form of the wafer will be described. An ordinary strip of single face pressure sensitive adhesive tape 11 is shown in FIG. 1(a) which may, for example, be tape having a width of ½ inch and length of approximately 2 inches. The adhesive surface is on the underside of strip 11 as seen in FIG. 1(a) and the upper surface of the tape 11 contains no adhesive and is preferably a surface material to which the pressure sensitive adhesive will readily adhere and from which it will readily peel. This tape may be any of the well-known pressure sensitive tapes which are currently available provided that the adhesive surface of the tape when adhered to its non-adhesive surface does not make too tight a bond. For shoe-making purposes a cloth tape is preferred for strength and for ease of separation in the rolling peel that is hereafter described.

Figure 1B:
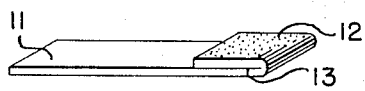

The strip of tape 11 is folded approximately one-fourth of its length as indicated in FIG. 1(b) to form an exposed adhesive surface 12 and a non-adhesive back-to-back portion of the tape 11 at the line indicated at 13. The fold 12 is folded once again upon the remaining portion of the single ply section of tape 11 to produce the configuration shown in FIG. 1(c) where the non-adhesive back-to-back surface 13 still exists and a new adhesive to non-adhesive bonded contact surface 14 is produced. The bond formed at the surface 14 is achieved by the adhesive surface 12 shown in FIG. 1(b) being turned under to contact a portion of the non-adhesive surface 11 which is in the central portion of the strip shown in FIG. 1(b). The final configuration consists of an exposed adhesive portion 15 which has approximately one-half the surface area of the underneath surface portion of the tape 11 in the final construction shown in FIG. 1(c). Thus the construction is seen to consist of a tubular wafer having an adhesive on the outside thereof at surfaces 15 and 16 and a non-adhesive interior for the tube at the back-to-back surfaces 13 integrally connected to a single sided pressure sensitive adhesive flange having a surface area 17 of adhesive approximately equal to that of the surface area 16.

Figure 1C:
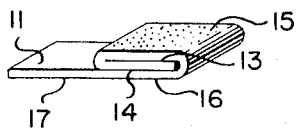
Figure 2B:
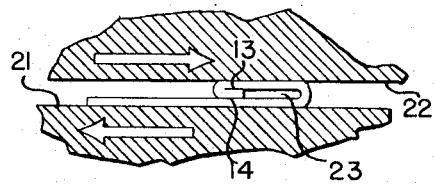
Figure 2C:
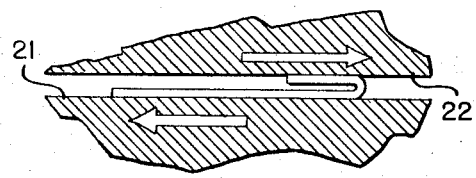

When the wafer shown at FIG. 1(c) is pressed between two surfaces to be joined as indicated in FIG. 2(a), the surfaces 16 and 17 adhere to a bottom surface 21 with an area of contact approximately twice that which the adhesive surface 15 adheres to a top surface 22. When the surfaces 21 and 22 are moved relatively in sliding motion as indicated in FIG. 2(b), the flanged roller wafer begins to peel the adhesive surface contact 14 and to enlarge the non adhesive back-to-back surface 13 now represented in FIG. 2(b) as the empty volume 23. Eventually the adhesive surface 14 is completely peeled and a condition generally similar to FIG. 1(b) occurs with a large adhesive area contacting the surface 21 and a relatively small adhesive surface contacting the surface 22. As the motion continues the attachment to the surface 22 is progressively reduced by the peeling action which action is assured because the peeling strength of the adhesive is less than the shear strength of the adhesive bond. Thus separation of the parts by moving the part to which the flange adhesive surface 17 adheres in the direction which the flange extends from the tubular portion invariably results in the strip of tape unrolled and adhering to the surface 21.

FIG. 3 shows one form for packaging the wafer of the present invention for convenience in storaging and dispensing. In FIG. 3 a relatively wide continuous strip of tape has been rolled along one edge into a tubular portion 31 with a flange portion 32 projecting therefrom. This rolling motion can be achieved by passing the tape through a suitably shaped die made of Teflon or other non adhesive material. The continuous strip so made is applied to a release paper backing 33 and rolled into a suitable length roll for use. Individual wafers can be obtained from the roll shown in FIG. 3 by making a transverse cut across the continuous flanged wafer strip that is unwound from the roll and separated from the release paper 33.

FIG. 4 shows an alternate form for packaging individual wafers in which the individual wafers 34 are formed and mounted on release paper 33 at spaced intervals.

Referring now to FIGS. 5, 6, and 7 the method of attaching a shoe parts particularly the attaching of an insole to a last will be described. One or more of the wafers 34 is attached to the last with the flange portion 32 adhered to the last and directed toward the heel of the last. An insole 35 is positioned in place on the last and adhered to the adhesive tubular portion 31 of the wafer 34. When the insole 35 is conformed to the bottom of the last the tubular wafer 31 is flattened to form two generally parallel fold lines which provide a high degree of strength in holding the insole in the desired position on the last.

After the desired lasting operations are performed the last is broken as indicated in FIG. 6 and the wafer used in the heel area peels is indicated at 36 due to the selective nature of the adhesive bond to the cloth adhesive tape from which the wafers 34 are preferably manufactured. As previously indicated, the pressure sensitive adhesive should peel readily from the cloth backing on the tape in comparison to the strength with which the adhesive adheres to the wooden last. As the last is slid out of the shoe the rolling peel described in connection with FIGS. 2(a), (b), and (c) occurs for wafers at positions 37 and 38 with the pieces of tape from which the wafers are made adhering to the last as the last is withdrawn. Accordingly the manufacturer does not need to make any special effort to inspect the shoes for wafers remaining inside the shoes and the loosely adhered adhesive tape strips that remain on the last can be easily removed and discarded prior to the next lasting operation. It will also be noted that the single sided adhesive flange extending from the tubular wafer provides a good non adhesive surface with which initially to press the wafer against the last before the insole or other shoe part is applied to the last. Thus a wafer 34 from the roll shown in FIG. 3 can be stuck to the last by a roller or other pressure applying member which touches only the non adhesive surface 32 of the flange thereby avoiding the complications of handling a wafer which has nothing but exposed adhesive surfaces with which to handle it.

We claim:
1. A pressure sensitive wafer for temporarily attaching two objects and selectively adhering the wafer to one of the objects when they are separated comprising a tubular strip of pressure sensitive tape having the outer surface of the tube coated with adhesive and no adhesive on the inner surface of said tube, said tube flattened to form two substantially parallel folded edges, and a single sided pressure sensitive adhesive extension attached to the outer surface of said tubular strip and extending substantially in the plane of the flattened tube beyond one of said edges.

2. A pressure sensitive wafer for temporarily attaching two objects and selectively adhering the wafer to one of said objects when said objects are separated comprising a strip of single sided pressure sensitive adhesive tape rolled to form a tube with a non adhesive surface inside the tube and a portion of said single sided adhesive strip extending beyond the joint formed by rolling said strip into said tube to form a flange of single sided adhesive which extends beyond the edge folds of said tube when said tube is flattened.

3. The wafer according to claim 2 formed from a continuous strip of single sided pressure sensitive adhesive tape rolled into a continuously flanged tube with the central axis of the tube parallel to the longitudinal axis of said strip, said tube being flattened and supported on a strip of release paper for dispensing as individual flanged tubular wafers by severing said continuous flanged tube transverse to said central axis.

4. A plurality of wafers according to claim 2 flattened and supported on a strip of release paper.

References Cited
UNITED STATES PATENTS

| | | | |
|---|---|---|---|
| 1,102,370 | 7/1914 | Wait | 24—67 |
| 1,295,334 | 2/1919 | Lautenschlager | 12—145 X |
| 2,860,081 | 11/1958 | Eiken | 24—67 |
| 3,257,678 | 6/1966 | Batchelder et al. | 12—142 |
| 3,052,904 | 9/1962 | Reid et al. | 12—142 |
| 3,257,677 | 6/1966 | Batchelder et al. | 12—142 |

PATRICK D. LANSON, *Primary Examiner.*

U.S. Cl. X.R.

12—142